US007805878B2

(12) United States Patent
Thomsen

(10) Patent No.: US 7,805,878 B2
(45) Date of Patent: Oct. 5, 2010

(54) APPLYING SCENT TO A FISHING LURE

(76) Inventor: Richard Thomsen, 1205 Avenue A, Snohomish, WA (US) 98290-2037

( * ) Notice: Subject to any disclaimer, the term of this patent is extended or adjusted under 35 U.S.C. 154(b) by 159 days.

(21) Appl. No.: 11/780,726

(22) Filed: Jul. 20, 2007

(65) Prior Publication Data

US 2009/0019761 A1    Jan. 22, 2009

(51) Int. Cl.
*A01K 97/06* (2006.01)
(52) U.S. Cl. .............................. 43/4; 43/54.1
(58) Field of Classification Search .......... 43/4, 43/4.5, 42.06, 54.1, 55, 25.2
See application file for complete search history.

(56) References Cited

U.S. PATENT DOCUMENTS

| | | | | |
|---|---|---|---|---|
| 2,249,327 A | | 7/1941 | Rairigh ............................. 43/4 |
| 3,051,605 A | * | 8/1962 | Stannard ..................... 156/196 |
| 3,453,770 A | * | 7/1969 | Schultz ........................ 43/57.1 |
| 4,054,204 A | * | 10/1977 | Keeton ....................... 206/83.5 |
| 4,073,085 A | * | 2/1978 | Stremeckus ................. 43/54.1 |
| 4,501,222 A | | 2/1985 | Stone .......................... 118/234 |
| 4,763,434 A | * | 8/1988 | Horneff ................... 43/18.1 R |
| 4,771,564 A | * | 9/1988 | Whitley ........................... 43/4 |
| 4,903,718 A | * | 2/1990 | Sullivan ...................... 134/184 |
| 4,968,439 A | * | 11/1990 | Leveen et al. ............... 210/764 |
| 4,977,854 A | * | 12/1990 | Marrs ......................... 118/683 |
| 5,097,616 A | * | 3/1992 | Johnston, Jr. ..................... 43/4 |
| 5,117,571 A | * | 6/1992 | Sites ................................. 43/4 |
| 5,170,582 A | * | 12/1992 | Morgin et al. ................ 43/54.1 |
| 5,187,890 A | * | 2/1993 | Johnston ........................... 43/4 |
| 5,246,114 A | * | 9/1993 | Underwood ............. 206/524.8 |
| 5,269,087 A | * | 12/1993 | Johnston ........................... 43/4 |
| 5,297,354 A | * | 3/1994 | McGriff ........................... 43/4 |
| 5,339,554 A | * | 8/1994 | Lippens ........................... 43/4 |
| 5,775,023 A | | 7/1998 | Botkins ............................ 43/4 |
| 5,956,881 A | * | 9/1999 | Dehm ............................. 43/4 |
| 5,970,644 A | * | 10/1999 | Breeze ............................ 43/4 |
| 6,039,488 A | | 3/2000 | Krawczyk et al. ........... 401/132 |
| 6,076,967 A | * | 6/2000 | Beaudette .................... 383/41 |
| 6,248,085 B1 | | 6/2001 | Scholz et al. .................. 604/2 |
| 7,296,378 B1 | * | 11/2007 | Cobb et al. ................ 43/42.06 |
| 2003/0014901 A1 | | 1/2003 | Dobbs et al. .................... 43/55 |
| 2004/0046049 A1 | | 3/2004 | Ricciardelli et al. ......... 239/288 |
| 2004/0088902 A1 | | 5/2004 | Dobbs et al. ............... 43/42.53 |
| 2005/0229475 A1 | | 10/2005 | Dobbs et al. .................... 43/55 |
| 2006/0213115 A1 | * | 9/2006 | Hubscher et al. ............. 43/44.9 |

OTHER PUBLICATIONS

Brown, Roger Lee. "Do "Scents" Really Make Sense?" http://www.fishin.com/articles/BassCoach/scents.htm.
Brown, Roger Lee. "Unique Products That Really Work" http://www.bassfishingnetwork.com/articles/unique_products.html.
"Bait Injector System" Pro-Cure Bait Scents. http://www.pro-cure.com/misc.html.

* cited by examiner

*Primary Examiner*—Benjamin P Lee
(74) *Attorney, Agent, or Firm*—Ronald M. Anderson

(57) ABSTRACT

A fishing lure is inserted into a housing opening and into contact with a liquid absorbent material. The housing is placed in fluid communication with a container of liquid fish attractant through a nozzle that extends through a port in the housing, and in one embodiment, through an elastomeric tube. Liquid fish attractant is dispersed from the container, through the nozzle, into the housing and onto the liquid absorbent material. The housing is closed, and compression is applied, pressing the fishing lure into the liquid absorbent material, thereby coating a portion of the fishing lure. The fishing lure can then be removed without a user's hands coming into contact with the attractant.

20 Claims, 4 Drawing Sheets

APPLYING SCENT TO A FISHING LURE

BACKGROUND

The fishing industry provides people with numerous fishing tackle products to choose from, including a variety of fishing lures and bait attractants. Although the pungency of the variety of scents available on the market today will vary, most people will agree that the scent is preferably transferred only to the fishing lure and not to the user. However, it is difficult to transfer this scent without having one's hands come in contact with the fishing lure, since the fishing lure must be sufficiently coated with the bait attractant in order to work properly.

A fishing lure can be held in one's hands while the scent is sprayed or otherwise applied to the lure, but this approach risks saturating the user's hands with an unpleasant odor of the scent and risks contaminating the lure with the scent of a human hand. In addition, it is likely that the fisherman will wipe off any scent inadvertently applied to the hands on clothing, or touch other items, thereby transferring some of this odor to other articles. This scent may make the person unwelcome when arriving home at the end of the day, regardless of the fresh catch brought home for dinner.

To avoid such problems, a user of fishing lure scent may try applying the scent to a lure while the lure lies either in the bottom of the fishing boat or, for example, on a tray in a tackle box, in order not to contaminate the user's hands, but this attempt inevitably results in the noxious odor attaching itself to expensive sporting equipment. In addition, there is no efficient way to reclaim the excess fish attractant applied to adjacent surfaces, once the lure is saturated with the scent. The user may also try dangling the lure out over the water while spraying or applying the liquid scent, but the user still risks the scent being blown back onto the user and equipment, if it is a windy day. Each of these approaches for applying fish attractant scent to a lure will often result in a substantial portion of the scent being transferred to the user's person or to articles other than the lure, and more bottles of fish attractant scent will be consumed trying to coat lures, because once a lure is saturated with the scent, any excess cannot be efficiently reclaimed and stored for later reuse.

Therefore, what is needed is an apparatus and method that enables coating of a fishing lure without transferring the scent to a user's hands, apparel, and other fishing tackle or articles, without contaminating the fishing lure with the scent of a human, and without wasting excess liquid fish attractant scent that is not initially retained by the fishing lure when applied.

SUMMARY

Accordingly, as one solution to the problem discussed above, an apparatus and method have been developed. In one exemplary embodiment, the apparatus is configured to be removably attached to a container of a liquid scent in order to enable hands-free coating of a fishing lure with the liquid scent. The apparatus includes a housing having an interior sized to accommodate a fishing lure. The housing has an upper portion, and a lower portion that is selectively coupled with the upper portion, so that the interior of the housing can be accessed for insertion and removal of a fishing lure. A port is disposed on the housing, and a liquid absorptive material is disposed within the housing. Also included is a nozzle having a distal end and a proximal end. The distal end of the nozzle is in fluid communication with the port such that the liquid scent can be injected through the nozzle and port and onto the liquid absorptive material. A fishing lure that has been placed in the interior of the housing thus comes into contact with the liquid absorptive material and the liquid scent absorbed by this material is thus applied to the fishing lure.

A standard-sized cap that is configured to be threaded onto a bottle of liquid fish attractant can also be coupled to the proximal end of the nozzle. Optionally, an elastomeric tube can be configured and sized to be coupled with a top of the bottle of liquid scent. As a further option, a protrusion can be disposed inside either the upper portion or the lower portion of the housing to ensure substantial contact between the liquid absorptive material and the fishing lure when the upper portion and the lower portion of the housing are pressed toward each other.

The apparatus can be stored atop the bottle of liquid scent so that excess liquid scent can be drained from the apparatus and back into the container of liquid scent. Accordingly, the apparatus is configured to be sufficiently light in weight so that the container of liquid scent can support the housing while the container remains upright.

Another aspect of this new approach is directed toward an exemplary method for applying a liquid animal attractant to a fishing lure so as to minimize contact of a user's hand with the animal attractant. The fishing lure is placed within a housing that is closable around the fishing lure. The housing is removably coupled in fluid communication with a container of the animal attractant. A portion of the liquid animal attractant in the container is transferred from the container into the housing and onto a liquid absorbent material. This liquid animal attractant is then dispersed from the liquid absorbent material and onto the fishing lure as the absorbent material is compressed, in order to coat the fishing lure disposed in the housing with the liquid animal attractant. The housing can be stored while it is still attached to the container of the liquid animal attractant in an orientation such that any excess animal attractant that is not retained by the pad of the liquid absorbent material drains back into the container.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 3:
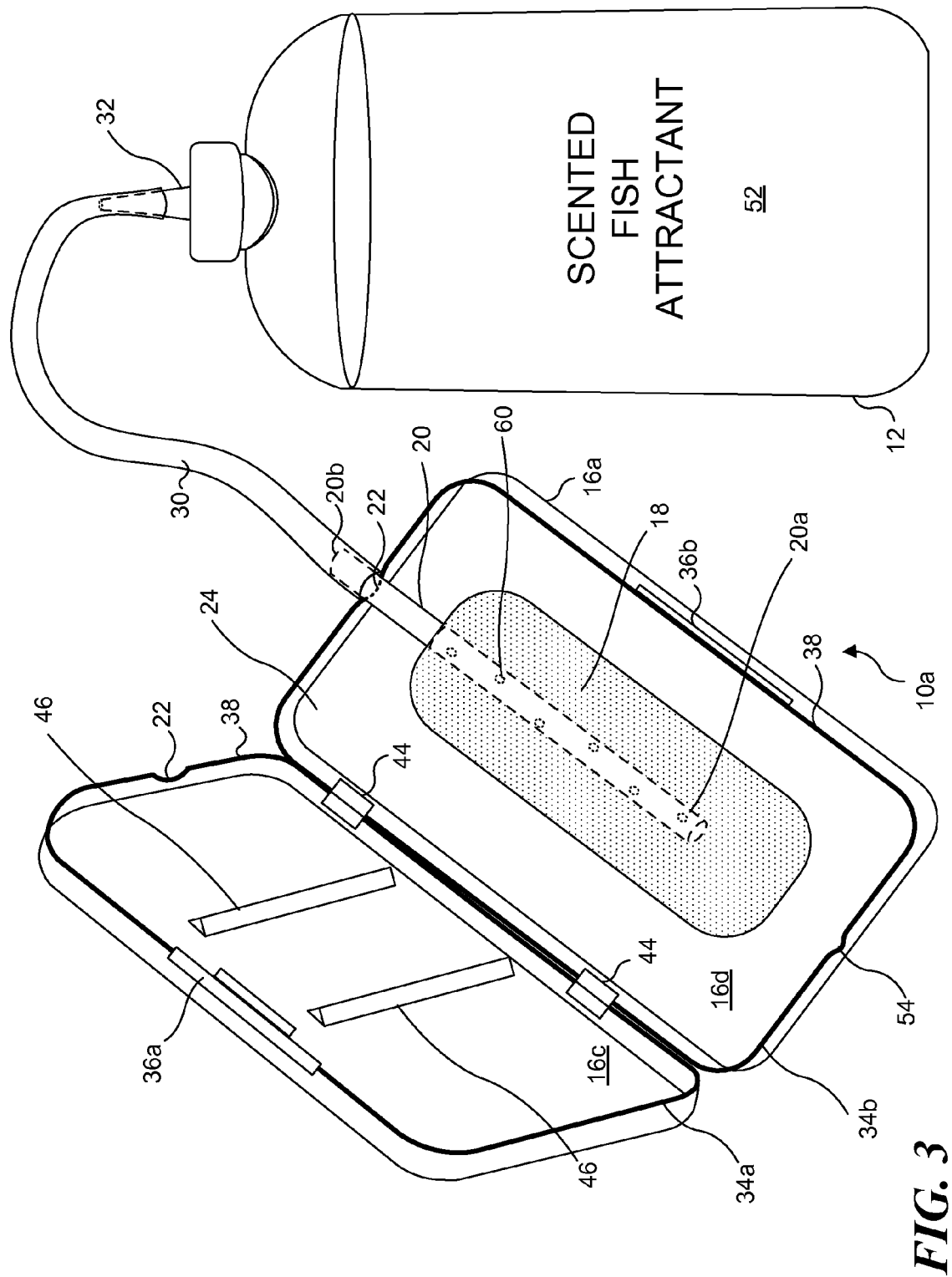
Figure 4:
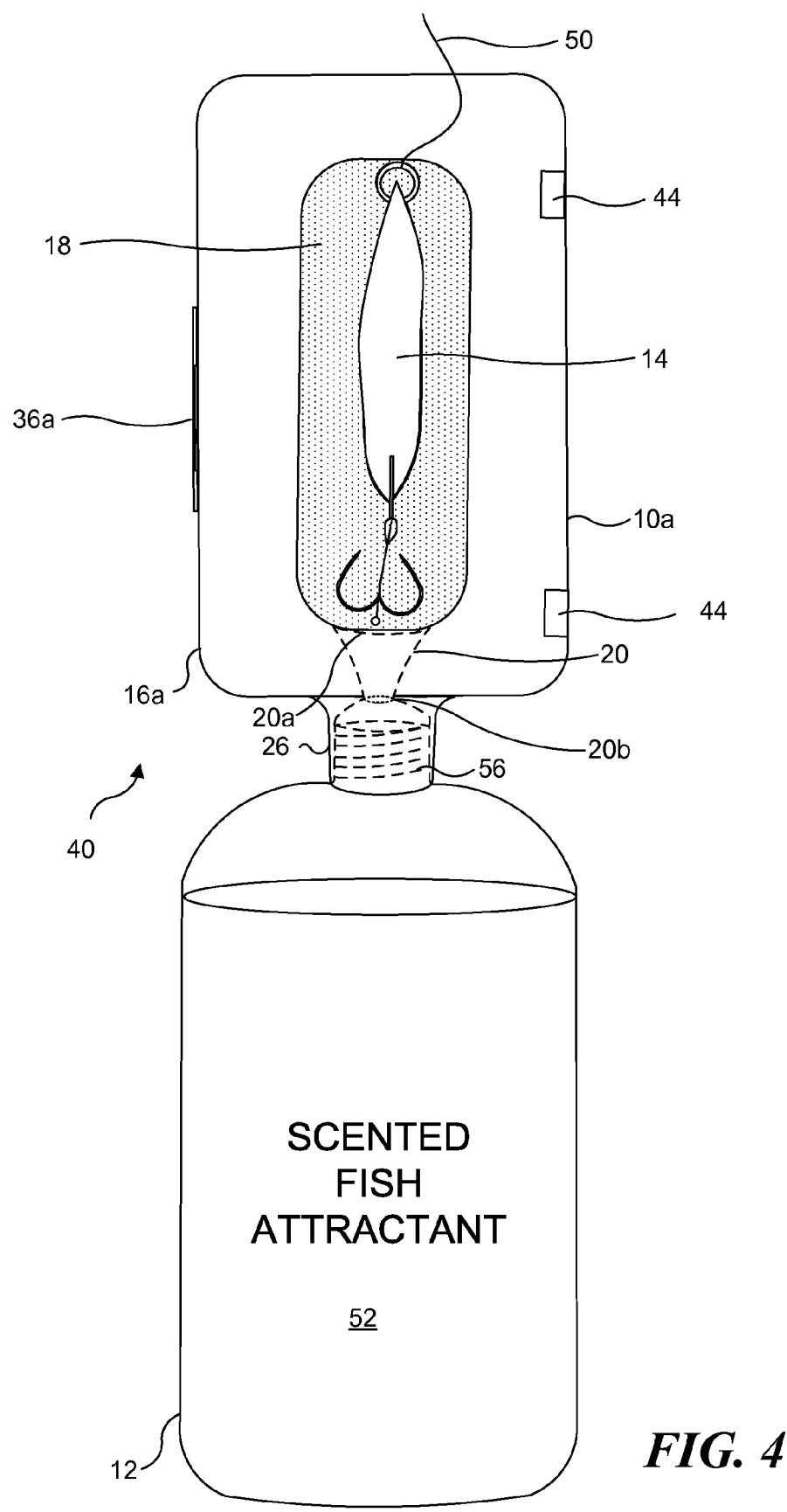

FIG. 3 illustrates an isometric view of a different exemplary embodiment of an apparatus for hands-free coating of a fishing lure with a liquid fish attractant; and FIG. 4 is a front elevational view of an exemplary embodiment that is being stored with a bottle of liquid fish attractant in an orientation that enables excess fish attractant to flow back into the bottle from the housing containing a fishing lure.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

The exemplary embodiments are useful apparatuses that provide people engaged in the sport of fishing, the ability to scent a fishing lure with a specific type of animal bait without requiring a user to directly handle the fishing lure once it has been coated with bait attractant and is ready to be cast out into the water, such that the scent is transferred to a user's hands, apparel or other fishing tackle. In addition, the apparatuses are configured to be of a design such that they can be stored in an upright position with a container of a liquid fish attractant. It is also contemplated that the exemplary embodiment can also be used for the general purpose of suffusing a component with a liquid contained in a bottle.

Figure 1:
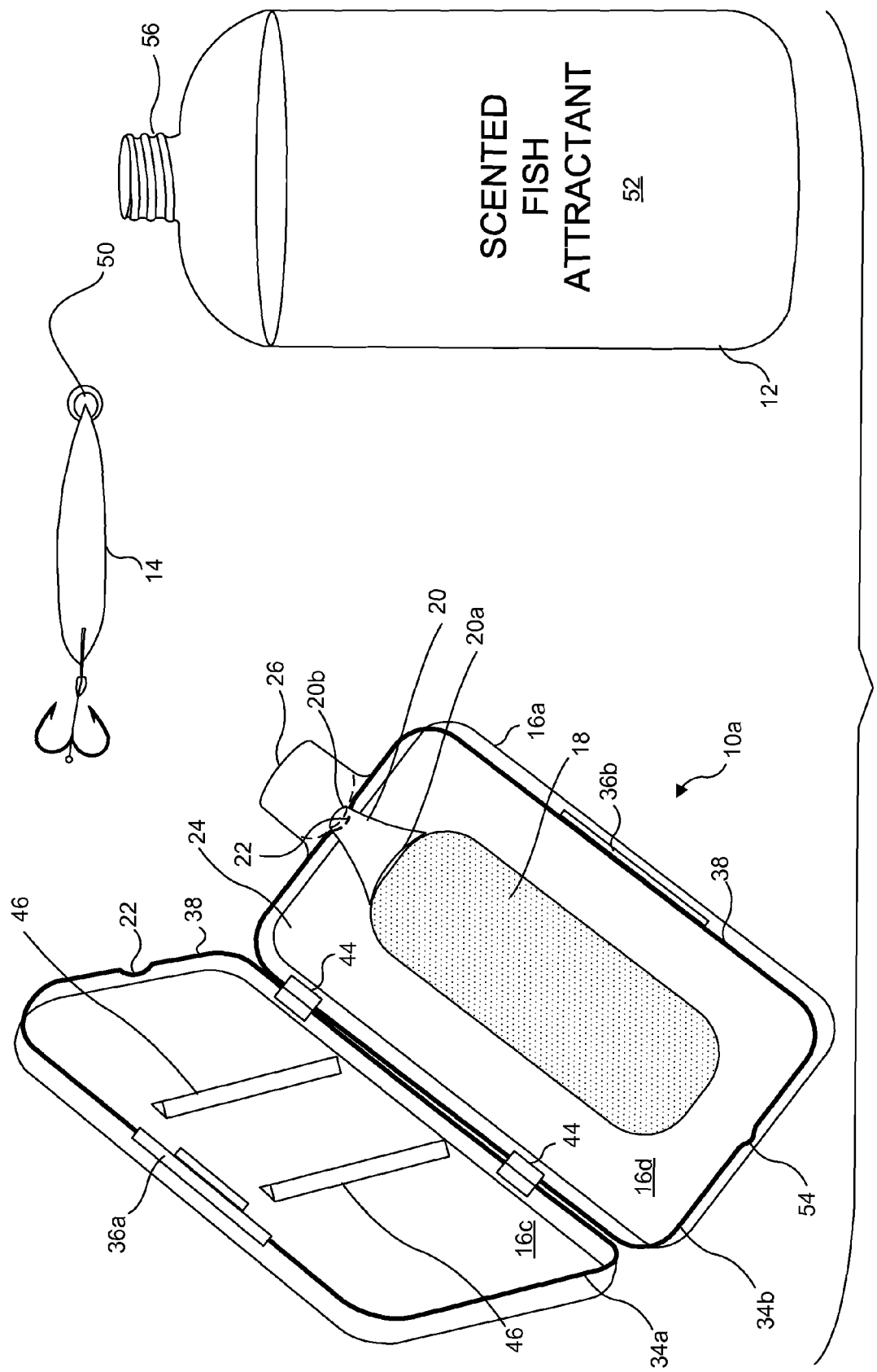
FIG. 1 illustrates an isometric view of an exemplary embodiment of an apparatus for hands-free coating of a fishing lure with a liquid fish attractant.

FIG. 1 illustrates an exemplary embodiment of an apparatus that is used to conveniently add scent to a fishing lure without transferring the scent to a user's hands. FIG. 1 illustrates a lure applicator 10a that is configured to be used with a fishing lure 14 and a container 12 of a liquid fish attractant 52. Lure applicator 10a includes an openable housing 16a that includes an upper portion 16c and a lower portion 16d, which are coupled by hinges 44 along one side, so that housing 16a can be opened to insert or remove a fishing lure. Housing 16a may be fabricated in a plurality of different sizes and shapes in order to accommodate a variety of different sizes and shapes of fishing lures that can be selectively inserted within the housing. An orifice 22 is shown disposed on a side of the housing. A nozzle 20, having a distal end 20a and a proximal end 20b is also included, and orifice 22 is sized to engage nozzle 20 so that proximal end 20b is disposed external to housing 16a and can be coupled in fluid communication with container 12 of the liquid fish attractant 52. Distal end 20a of nozzle 20 is disposed within an interior 24 of housing 16a adjacent to an end of an absorbent pad 18, so that liquid fish attractant entering the housing through nozzle 20 flows onto and is absorbed by absorbent pad 18. In this exemplary embodiment, nozzle 20 is manufactured such that it is funnel-like in shape, but those skilled in the art will recognize that nozzle 20 can be made cylindrical or in other shapes.

In this exemplary embodiment, absorbent pad 18 is disposed on the inner surface of lower portion 16d of the housing. The absorbent pad may be an open-cell foam pad, a sponge, or other type of wettable pad that is characterized by its ability to readily absorb a liquid and by being soft and malleable. The absorbent pad can comprise any material that has the ability to retain liquid in its uncompressed state and the ability to dispense liquid when compressed.

Orifice 22 of FIG. 1 is formed in upper portion 16c and lower portion 16d of the housing. Those skilled in the art will recognize that orifice 22 can be readily disposed at other locations on housing 16a, so long as distal end 20a is in proximity to absorbent pad 18 to enable fluid communication with the liquid fish attractant entering the nozzle. Alternatively, in another embodiment that is not shown, nozzle 20 can be formed as an integral part of either the lower or upper portion of housing 16a. A fitting such as a cap 26 is coupled to nozzle 20 and is configured to removably connect lure applicator 10a to container 12. In an exemplary embodiment, housing 16a and cap 26 are molded as a single unit, such that cap 26 is an integral part of housing 16a. Those skilled in the art will recognize that nozzle 20 may be configured to a variety of different sizes in order to attach lure applicator 10a to different sizes of containers that hold the liquid fish attractant. Ridges 46 are disposed on upper portion 16c of housing 16a. Ridges 46 are sized such that they apply a force that presses fishing lure 14 onto absorbent pad 18 when the upper portion and the lower portion are moved toward each other because the ridges protrude into the interior of the housing, thereby compressing the absorbent pad and causing the liquid fish attractant to flow out of absorbent pad 18 and onto the fishing lure.

In the exemplary embodiment of lure applicator 10a, the upper portion of the housing is pivotally coupled to the lower portion by hinges 44, which are disposed along an upper edge 34a of the upper portion and along a lower edge 34b of the lower portion of housing 16a. Those skilled in the art will recognize that alternative designs exist for removably affixing the upper portion of the housing to the lower portion, including but not limited to a single hinge, a rotatable joint, or flexible material connecting the two portions. An elastomeric seal 38 is provided along the facing surfaces of the edges of the upper portion and the lower portion of the housing, so that when housing 16a is closed, the elastomeric seal generally prevents the liquid fish attractant from leaking out of the housing along its edges.

Also disposed on housing 16a is a notch 54. Notch 54 is optionally disposed on lower portion 16d and enables a fishing line 50 (see FIG. 3) that is attached to fishing lure 14 to pass from interior 24 of the housing. Alternatively, lure applicator 10a can be formed from a moderately flexible plastic so that fishing line 50 can be conveyed from the interior of the housing by simply closing the upper and lower portions together over the fishing line, thereby eliminating notch 54. This approach can be used if fishing line 50 is of sufficiently small diameter, such as a fly line leader, so as to not interfere with the edges of the housing sealing properly. However, if lure applicator 10a is being used to coat a larger fishing lure, for example, one used by salmon fishermen so that the fishing line is a relatively larger diameter, then notch 54 may be required to ensure that a good seal is obtained by closure of the housing.

A fastener, such as a clasp 36a disposed along a side of upper portion 16c that engages a rib 36b disposed on a corresponding side of lower portion 16d, secures the upper portion and the lower portion of the housing together when the housing is closed. In addition, in order to prevent leaking of the liquid fish attractant from the housing, elastomeric seal 38 is provided around the edges of the upper and lower portions of the housing, around the orifice, and within the notch, as discussed above.

Figure 2:
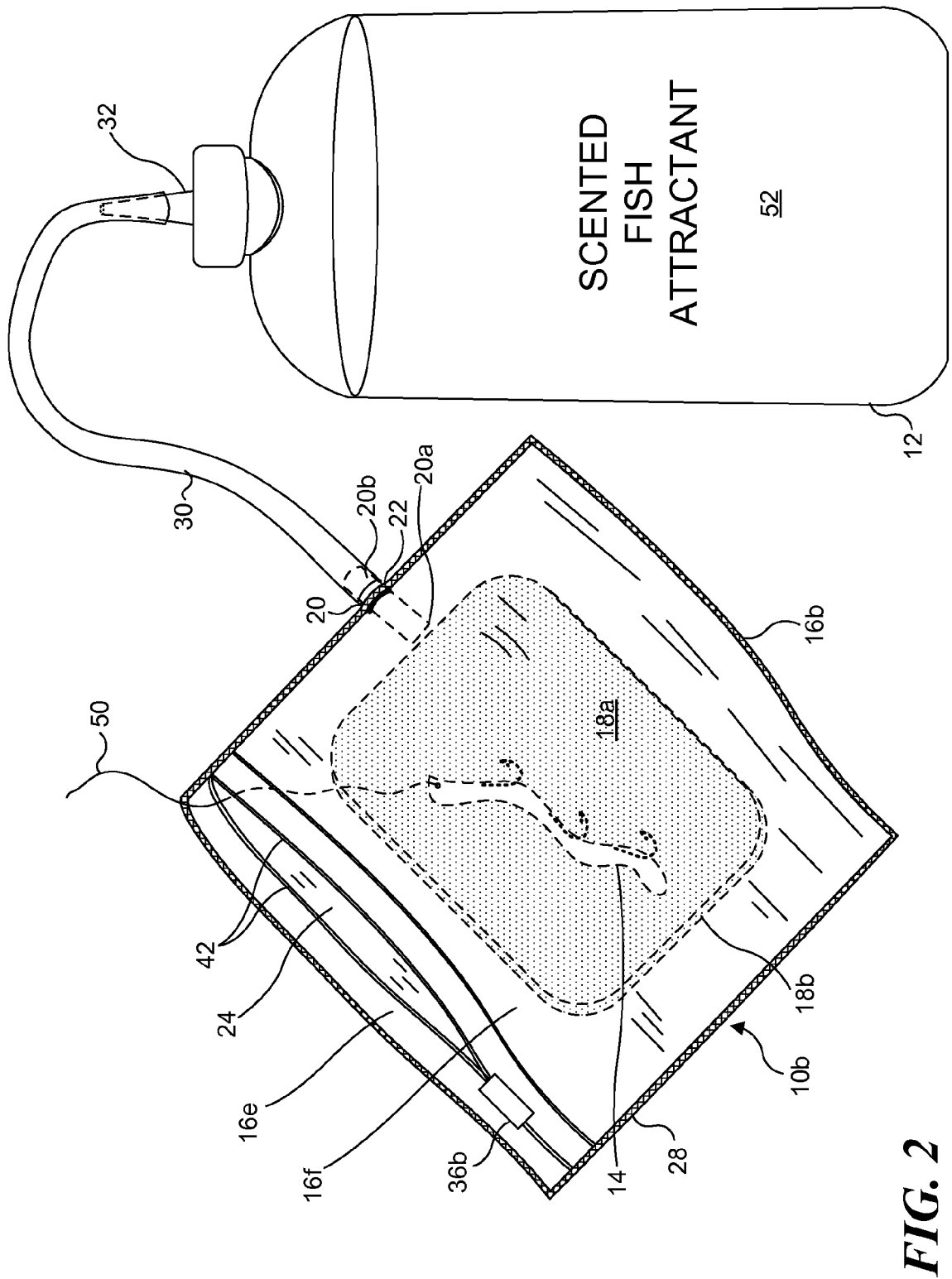
FIG. 2 illustrates an isometric view of an another exemplary embodiment of an apparatus for hands-free coating of a fishing lure with a liquid fish attractant.

FIG. 2 illustrates another exemplary embodiment of an apparatus, a lure applicator 10b that is also configured to conveniently apply scent to a fishing lure without transferring the scent to a user's hands. Lure applicator 10b includes a housing 16b that includes a first portion 16e and a second portion 16f comprising flexible sheets of an elastomeric material such as plastic. The first and second portions are shown separated from each other along part of sealable closures 42 in FIG. 2, to illustrate housing 16b when it is partially open. In this alternative exemplary embodiment, housing 16b is configured as a flexible pouch or bag. Those skilled in the art will recognize that many other shapes and configurations of housings could be used instead of the exemplary embodiments illustrated for housing 16a of FIG. 1 and for housing 16b of FIG. 2. For example, the housing might be formed as a cylindrical or square-shaped container with a lid or other enclosure that can be sealed and reopened, thus enabling insertion and removal of a fishing lure, and provided with corresponding means for applying a liquid fish attractant to the lure that is placed within the housing.

Orifice 22 is shown disposed on a peripheral edge 28 of housing 16b. Nozzle 20, having distal end 20a and proximal end 20b is also included such that orifice 22 is again sized to engage nozzle 20 such that proximal end 20b lies external to housing 16b and is in fluid communication with liquid fish attractant 52. Distal end 20a is disposed within interior 24 of housing 16b and is still in fluid communication with absorbent pad 18. Absorbent pad 18a that is included within the interior of housing 16b is disposed and attached (for example, using an appropriate adhesive) on one of the inside surfaces within the housing, and optionally, as shown in FIG. 2, another absorbent pad 18b can be included and attached on the other inside surface of the housing. Housing 16b is sealed around peripheral edge 28, for example, by thermally melting and sealing together the edges of the elastomeric sheet material used to form the housing.

An alternative fitting, such as an elastomeric tube 30, is coupled to nozzle 20 and serves to removably connect lure applicator 10b to the top of container 12. Elastomeric tube 30 is sufficiently elastic such that it can be sealingly coupled to different size tops. Containers of liquid fish attractant typically include a top with a nozzle for spraying or squirting the fish attractant onto a fishing lure. In FIG. 2, container 12 is illustrated with a spout 32, over which is slipped the proximal end of elastomeric tube 30. Because of its elasticity, elastomeric tube 30 can readily be used to couple lure applicator 10b in fluid communication with different sizes of animal attractant containers.

In the exemplary embodiment of lure applicator 10b, the first portion of housing 16b is engaged to the second portion by a slide fastener 36b along sealable closures 42, which can be of the same type of compression locking seals used on plastic bags for food products, or other types of sliding sealable closures, as will be well known to those of ordinary skill. Slide fastener 36b engages the sealable closure of the first and second portions such that these portions sealingly interlock when the slide fastener is slid in one direction and these portions separate when the slide fastener is pulled in the opposite direction. Those skilled in the art will recognize that a variety of other types of fasteners can be used, including but not limited to, adherently sealable flaps, foldable flaps that are retained with hook and pile fastener strips, or other types of strips that interlock to firm a generally fluid-tight seal. In addition, although notch 54 is not shown in FIG. 2, if it is desired to place fishing lure 14 into opened housing 16b while attached to fishing line 50 as illustrated in FIG. 2, then the fishing line can be placed at one end of the slide fastener, such that the slide fastener can almost be closed, except for a small portion that remains unfastened, so that the fishing line or leader can readily pass out of the interior of the housing.

FIG. 3 illustrates yet another exemplary embodiment of an apparatus that is configured to conveniently add scent to a fishing lure without transferring the scent to a user's hands. In this embodiment, lure applicator 10a can be coupled in fluid communication with container 12 of liquid fish attractant 52 via elastomeric tube 30, as explained above in connection with FIG. 2. In addition, nozzle 20 has been configured such that it is disposed directly over a portion of absorbent pad 18.

A plurality of orifices 60 are provided on nozzle 20 such that liquid fish attractant 52 is dispersed more directly and over a wider area onto the absorbent pad through orifices 60.

Method of Use

A method for using lure applicator 10a and lure applicator 10b includes the following steps, which produce an assembled unit 40, as shown in FIG. 4. The method begins with opening housing 16a of the lure applicator (FIG. 1). With respect to lure applicator 10a, force is applied to clasp 36a to disengage it from rib 36b (not shown in FIG. 4) such that one side of the upper portion of housing 16a is separated from the corresponding side of the lower portion of housing 16a. These two portions pivot apart from each other relative to hinges 44. Fishing lure 14 is then placed within the interior of housing 16a and generally centered on absorbent pad 18. If the fishing lure is attached to fishing line 50 (and if the fishing line is of a sufficiently large diameter), a user may decide to insert the fishing line into notch 54 so that when the housing is closed, the diameter of the fishing line will not interfere with the seal of the housing, so as to allow leakage of the liquid fish attractant. In the alternative, if the fishing line is of a sufficiently thin diameter, the housing can be closed over the fishing line without breaking elastomeric seal 38, which extends around the peripheral facing edges of the upper and lower portions.

Lure applicator 10a is then attached via cap 26 to a top 56 of container 12. Liquid fish attractant 52 is dispensed from the container, passing through nozzle 20 and onto absorbent pad 18. Because proximal end 20b of nozzle 20 is disposed in proximity to the absorbent pad, the absorbent pad absorbs much of the liquid fish attractant that is injected through nozzle 20. Absorbent pad 18 then coats a portion of the fishing lure. Pressure can be increased by squeezing on opposite sides of the housing so that ridges 46 increase the force applied by the fishing lure against the absorbent pad, forcing the fish attractant it has absorbed to be released to more fully coat the fishing lure. In the alternative, the fishing lure can be compressed into the absorbent pad by the force exerted by simply closing the upper portion over the lower portion and fully engaging clasp 36a with rib 36b.

Housing 16a is then opened and the fishing lure can be selectively removed by grasping a portion of the fishing lure that has not been coated by the liquid fish attractant since it is the bottom portion of the fishing lure that was in contact with the absorbent pad. The fishing lure can then be attached to the fishing line. In the alternative and perhaps better approach, the fishing lure will already be attached to the fishing line when coated with the fish attractant. The user can then simply open the housing and remove the fishing lure by grasping and lifting it with the fishing line. A user can then close the housing and conveniently place the assembled unit 40 (generally as shown in FIG. 4) in a pocket of apparel, such as a shirt pocket or fishing vest pocket. In the alternative, assembled unit 40 may be placed in its upright position in a fishing tackle box or on a shelf or other storage location. So long as the housing remains positioned above container 12, any excess liquid fish attractant that is not retained in the absorbent pad or retained on the fishing lure is enabled to conveniently drain out of housing 16a, through the nozzle, and back into container 12, thereby conserving the liquid fish attractant for future use.

Those skilled in the art will recognize, however, that certain of the above steps may be performed in a different order. For example, a user may first attach the closed housing to the container of the liquid fish attractant, dispense the liquid fish attractant onto the absorbent pad and then open the housing, insert the fishing lure and compress the fishing lure into the absorbent pad.

The method for using lure applicator 10b is similar and includes the following steps. The method begins when housing 16b (FIG. 2) of the lure applicator is opened. With respect to lure applicator 10b, slide fastener 36b is operated so as to expose an opening into housing 16b along sealing closures 42. Fishing lure 14 is then placed within housing 16b. Lure applicator 10b is attached via elastomeric tubing 30 to spout 32 of container 12. Liquid fish attractant 52 is then dispensed from the container, through elastomeric tubing 30 and nozzle 20, and onto the absorbent pad. Compression is then applied to the exterior of the lure applicator, thereby pressing the fishing lure against the absorbent pad so that some of the fishing attractant absorbed by the absorbent pad is forced out and is applied to the fishing lure.

Housing 16b is then opened. Depending on the configuration of the absorbent pad within, the fishing lure can be selectively removed by grasping a portion of the fishing lure that has not been coated by the liquid fish attractant, because that portion of the fishing lure was not in contact with the absorbent pad. The unscented portion of the fishing lure can then be manipulated to attach it to the fishing line so that the user's hands do not contact the scented portion. In the more likely alternative, the fishing lure will already be attached to the fishing line, and a user can simply open the housing with the slider and remove the fishing lure using the fishing line to manipulate the fishing lure, which now has the fish attractant applied to it.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. Apparatus configured to be removably attached to a container of a liquid fish attractant scent in order to enable hands-free coating of a fishing lure with the liquid fish attractant scent, comprising:
   (a) a hingeldy openable housing having an opening through which a fishing lure can be selectively inserted and closed to seal around the fishing lure, the housing including an absorbent pad disposed in an interior of the openable housing, and an inlet port separate from the opening of the housing, the nozzle mounted within the inlet port and adjacent to the absorbent pad, to enable the liquid fish attractant scent that is added to an interior of the openable housing through the inlet port and the nozzle to be applied directly to the absorbent pad; and
   (b) fluid communication means for fixedly attaching and coupling an outer end of the nozzle mounted within the inlet port of the housing to the container of the liquid fish attractant scent, for conveying the liquid fish attractant scent, along a sealed fluid communication path extending from the container of the liquid fish attractant scent through the inlet port of the housing, even when the housing has been closed and sealed around the fishing lure, the liquid fish attractant scent flowing from the container of the liquid fish attractant scent through the sealed fluid communication path, and through the inlet port to the absorbent pad in the interior of the openable housing in which a fishing lure is disposed; and
   the absorbent pad absorbing the liquid fish attractant scent and coating the fishing lure with the liquid fish attractant scent.

2. Apparatus for applying a liquid animal attractant to a fishing lure such that a user's hands can readily avoid contact with the liquid animal attractant, comprising:
   (a) a housing having an interior sized and shaped to accommodate a fishing lure, the housing including:
      (i) an upper portion;
      (ii) a lower portion coupled with the upper portion so that the interior of the housing can be selectively accessed for insertion and removal of a fishing lure; and
      (iii) a port disposed on the housing, separate from an opening into the interior of the housing, and providing fluid access to the interior of the housing when the housing is fully closed to seal the opening;
   (b) a liquid absorptive material disposed and affixed to an inner surface of one of the upper portion and the lower portion within the housing; and
   (c) a nozzle mounted within the port and projecting into the interior of the housing having a distal end and a proximal end, the distal end of said nozzle being disposed adjacent to the liquid absorptive material, such that the liquid animal attractant can be injected through the nozzle and port, directly onto the liquid absorptive material, to apply the liquid animal attractant to a fishing lure that has been placed in and sealed within the interior of the housing, in contact with the liquid absorptive material, the proximal end of the nozzle being configured to removably fixedly attach and couple the port to a container of the liquid animal attractant, to form a sealed fluid communication path for receiving and conveying the liquid animal attractant that is being applied to the liquid absorptive material through the nozzle and port.

3. The apparatus of claim 2, wherein the proximal end of the nozzle is configured to removably couple in fluid communication with a container of the liquid animal attractant, to enable the liquid animal attractant to be conveyed from the container and into the interior of the housing through the nozzle and the port.

4. The apparatus of claim 2, further comprising a cap that is coupled to the nozzle, the cap being sized to sealingly couple with a container of the liquid animal attractant.

5. The apparatus of claim 4, further comprising a plurality of different size caps, each different size cap being configured to couple with a different size opening in different containers of the liquid animal attractant.

6. The apparatus of claim 2, wherein the nozzle is sized to couple with an elastomeric tube that is configured and sized to be coupled with a top of a container of the liquid animal attractant to enable the nozzle to convey the liquid animal attractant into the interior of the housing.

7. The apparatus of claim 2, wherein an edge of the upper portion of the housing is hingedly coupled with a corresponding edge of the lower portion of the housing, thereby enabling the housing to be opened, for insertion and removal of a fishing lure.

8. The apparatus of claim 2, further comprising at least one fastener that couples the upper portion and the lower portion of the housing together in a manner that enables at least a part of each of the upper portion and the lower portion of the housing to be selectively moved apart, to access the interior of the housing.

9. The apparatus of claim 2, wherein the liquid absorptive material comprises an open-cell foam pad.

10. The apparatus of claim 2, wherein the liquid absorptive material includes an upper part that is sized to fit within the upper portion of the housing, and a lower part that is sized to fit within the lower portion of the housing.

11. The apparatus of claim 2, wherein the liquid absorptive material is affixed to at least one of the upper portion and the lower portion of the housing.

12. The apparatus of claim 2, wherein the liquid absorptive material is in fluid communication with the fishing lure when the upper portion and the lower portion of the housing are compressed by a force applied external to the housing, to press the upper portion and the lower portion of the housing toward each other.

13. The apparatus of claim 2, wherein the housing further comprises a protrusion disposed internal to either the upper portion or the lower portion such that the protrusion presses a fishing lure against the liquid absorptive material, when the upper portion and the lower portion of the housing are pressed toward each other.

14. The apparatus of claim 2, wherein the apparatus is configured to be of a weight sufficiently light that the apparatus can readily be supported in an upright orientation atop a bottle comprising a container of the liquid animal attractant with which the apparatus is in fluid communication.

15. The apparatus of claim 2, wherein the housing further comprises a notch sized to accommodate a fishing line that is attached to a fishing lure while the fishing lure is disposed in the interior of the housing.

16. The apparatus of claim 2, wherein the housing further includes a sealable closure that can be selectively opened or closed.

17. A method for applying a liquid animal attractant to a fishing lure so as to minimize contact of a user's hand with the liquid animal attractant, including the steps of:
   (a) placing a fishing lure within a housing through an opening that is closable around the fishing lure and closing the housing to seal the fishing lure within the housing, the housing including an inlet port separate from the opening, through which the liquid animal attractant can be added to an interior of the housing;
   (b) removably attaching and affixing the inlet port of the housing to a container of the liquid animal attractant, so that the inlet port engages and is connected to the container of the liquid animal attractant, the inlet port being thereby connected to the container through a sealed fluid communication path that fixedly connects the interior of the container with the interior of the housing, even after the housing is closed around the fishing lure;
   (c) transferring a portion of the liquid animal attractant from the container into the housing through the sealed fluid communication path; and
   (d) coating the fishing lure disposed in the housing with the liquid animal attractant.

18. The method of claim 17, wherein the housing includes a pad of a liquid absorbent material that receives the liquid animal attractant transferred from the container, further comprising the step of applying a compression force to the pad of the liquid absorbent material to force the liquid animal attractant out of the absorbent material and into contact with the fishing lure, so as to apply the liquid animal attractant to the fishing lure.

19. The method of claim 18, wherein the step of applying compression comprises the steps of:
   (a) closing the housing with the fishing lure disposed therein, such that the fishing lure is pressed against the pad of the liquid absorbent material; and
   (b) applying an external force on opposite sides of the housing such that the fishing lure is pressed against the pad of the liquid absorbent material.

20. The method of claim 17, further comprising the step of storing the housing while it is attached to the container of the liquid animal attractant such that any excess animal attractant that is not retained by the pad of the liquid absorbent material or by the fishing lure drains back into the container of the liquid animal attractant.

* * * * *